United States Patent Office 3,062,869
Patented Nov. 6, 1962

3,062,869
REDUCTION OF NITRILES
Francis E. Gould, Princeton, N.J., assignor to FMC Corporation, a corporation of Delaware
No Drawing. Filed Nov. 7, 1958, Ser. No. 772,410
21 Claims. (Cl. 260—482)

This invention relates to a novel and improved method for the catalytic hydrogenation of nitriles.

An important source of primary amines in organic synthesis is by way of the corresponding nitrile, from which primary amines are obtained by reduction. As is well known, it is difficult to obtain primary amines in good yields by this method. Heretofore, best results have generally been obtained by catalytic hydrogenation using precious metal catalysts, such as platinum or palladium in various forms. These catalysts are effective at relatively low pressures, but they are expensive and readily poisoned, so that their use in quite limited. Another important method which has been used to reduce nitriles is catalytic hydrogenation with finely divided nickel catalysts, commonly prepared by the Raney process. These Raney nickel reductions require the use of high pressures, generally of the order of at least 500 p.s.i., and usually in conjunction with solvent systems containing ammonia. Because of these requirements, and the relatively poor yields obtained, the primary amines produced heretofore by Raney nickel catalysis have also been expensive. A continuing need has existed for an economical and efficient method for the reduction of nitriles to primary amines in high yields at low pressures.

It has now been discovered that nitriles may be reduced in excellent yields, at low pressures including atmospheric, to produce primary amines and acyl derivatives of primary amines, if a finely divided metal catalyst of the Raney type is used in conjunction with at least an equimolar amount of an aliphatic acid anhydride per primary amine formed.

It has further been discovered that when such a hydrogenation is carried out in the presence of an alkaline substance, and particularly a strong base, it proceeds at an accelerated rate and in improved yield, often quantitatively.

The process of this invention is not only carried out at low or atmospheric pressures, in comparison with currently used methods for reducing nitriles with Raney catalysts where substantially higher pressures are employed, but in addition the instant reaction takes place at relatively low temperatures, in comparison with typical commercial reductions of nitriles which generally require temperatures above 150° C. These advantages are accompanied by the use of an inexpensive catalyst which is not readily poisoned, as compared with the precious metal catalysts which are normally required to permit mild reduction conditions.

A further advantage of the instant invention is that nitriles may be reduced simultaneously with other functional groups which are themselves readily reducible and which tend to decompose or rearrange at the higher temperatures heretofore required for the reduction of nitriles with Raney catalysts. Thus, if the organic nitrile also contains double or triple bonds, oxime groups, nitro groups, keto groups and other readily reducible groups, simultaneous reduction of these is accomplished. On the other hand, if groups are present such as hydroxyl, amino or others which might decompose or rearrange at high temperatures, compounds containing such groups may be reduced at low temperatures by the method provided herein.

The catalyst employed is a finely divided metal of the Raney type, such as is described in United States Patent 1,628,190. These catalysts are commonly referred to as Raney catalysts. Raney catalysts are generally nickel or cobalt catalysts, used either alone or alloyed with other metals such as copper, zinc, chromium, molybdenum, iron, cerium or platinum. Raney catalysts are commercially available, as the active finely divided metal catalyst, and also as alloys containing approximately equal weights of the desired metal and aluminum, from the Raney Catalyst Company of Chattanooga, Tennessee. The active Raney catalyst is generally supplied and stored under water, although any inert liquid may be used to protect the catalyst from the air. Before use the water, or other liquid if it is not desired in the reaction mixture, is washed out with an organic solvent which is conveniently the solvent to be used in the reduction, but which may also be any organic solvent which is miscible with both water and the solvent to be used in the reaction. Alcohol and ethyl acetate are useful solvents for removal of water. These solvents could remain in the reaction mixture during the reduction, or be washed out before reduction with the acid anhydride.

If the Raney catalyst is provided as the aluminum alloy, the aluminum is dissolved out of the alloy with sodium hydroxide, and the residual active Raney catalyst, after thorough washing is stored until use under water or some other liquid. The preparation of various Raney nickel catalysts is described in "Organic Syntheses," Coll. vol. III, John Wiley & Sons (New York 1955), pages 176–183.

As the acid anhydride used in the reduction system, liquid aliphatic anhydrides, such as acetic, propionic and butyric anhydrides, and halogenated derivatives thereof, are preferred for reasons of economy and availability, and since the organic nitrile is more readily soluble therein than in higher anhydrides. These and other anhydrides, including normally solid anhydrides, may be used in a suitable solvent, which solvent must at least partially dissolve the anhydride and the compound being reduced, and be itself inert in the reaction. Useful solvents include esters of carboxylic acids, ethers including cyclic ethers such as dioxane and tetrahydrofuran, hydrocarbon solvents including benzene and alkyl benzenes, petroleum solvents, petroleum ether and the like.

One mole of anhydride is required per nitrile group being reduced. If more than one amine-forming group is present in the molecule, correspondingly larger amounts of anhydride are used. If an inert solvent is present in the reaction mixture, this stoichiometric amount of anhydride is sufficient. If the anhydride itself is serving as solvent for the reaction, a larger amount of anhydride should be present, and it has been found that at least a four molar excess of anhydride should be present, and it has been found that at least a four molar excess of anhydride should be used for good yields.

The hydrogenation is accelerated and the yield of amine is improved by the presence of an alkaline substance in the reaction mixture. This may be a weak base, such as alkali metal and alkaline earth acetates, propionates, carbonates, cyanides, borates, sulfites and other basic salts of weak acids. Alkaline salts of the acid corresponding to the anhydride used in the reaction are preferred, for convenience and for ease of recovery. Pyridine and other amines have also been found to benefit the reduction.

It has been discovered that, when a small amount of a strong base is added to the reduction system, the reaction rate is accelerated over that observed with weak bases. In fact in the presence of strong base the reaction may in some cases be so strongly exothermic that control of the temperature is necessary. Further, the catalyst recovered from such a reduction is very active, and may be reused without reactivation, thus making possible a continuous catalytic process. As the strong base, inorganic hydroxides such as the alkali metal and alkaline earth hydroxides, and other highly alkaline materials such as benzyltrimethylammonium hydroxide, are very effective.

The practical effect of the added base varies with the type of compound being reduced. For example, an easily reducible compound such as benzonitrile was reduced in excellent yield in the absence of any alkaline additive. In the presence of a strong base such as potassium hydroxide, the reduction of benzonitrile proceeded so rapidly and exothermically that it was difficult to control, so that it is preferable in the case of such compounds to omit the base entirely. On the other hand, a compound such as ethyl 5-cyano-2-oximinovalerate is much less readily reducible; yet this compound was reduced in essentially quantitative yield in about fifteen minutes by adding a small amount of potassium hydroxide to the hydrogenation mixture, and in the absence of any basic additive very poor yields were obtained even after six hours of hydrogenation.

A sufficient amount of Raney catalyst should be used to complete the reduction within a reasonable time. As the amount of catalyst is increased, so is the rate of hydrogen uptake. For most systems, at least about one gram of catalyst is required per gram-mole of reducible groups, with about four to five grams of catalyst preferred for controlled reaction in a reasonable time. The optimum amount of catalyst depends somewhat on the purity of the components of the reaction mixture, since anything which tends to poison the catalyst would necessarily affect the minimum amount of catalyst which will produce good yields. Larger amounts of catalyst may of course be used, although large excesses tend to complicate the working-up process and are not necessary for good yields or rapid reaction rates. The catalyst may be reused, and if the hydrogenation is conducted continuously, for example in a fixed or fluid catalyst bed, proportions of catalyst and reactants may be varied widely to meet process requirements.

The amount of basic additive used in the hydrogenation mixture varies with the type of compound being reduced, and as stated above some nitriles require no additive at all for good yields. For economy and convenience, it is preferred to use as basic additive an alkali metal salt of the acid corresponding to the anhydride reactant. The amount used is not critical. These salts are only partially soluble in the anhydride medium, which is generally saturated when less than about 0.2 mole of a basic salt, such as sodium acetate, is used per mole of reducible groups; thus, the amount of salt used may conveniently be limited by its solubility. If an appropriate inert solvent is present the amount of basic salt dissolved may of course be increased, but this is not necessary for good yields in a reasonable time.

In the case of the alkaline hydroxide additives, the reaction often becomes too vigorously exothermic when more than about an equimolar amount of base per reducible group is used, so that undesired side reactions occur. In general, excellent results are obtained using about 0.1 to 0.5 mole of strong base per reducible group; although two moles of strong base has been used effectively, with temperature control. As little as 0.02 mole of strong base has a noticeable effect on the reaction rate, often comparable to that obtained when a basic salt is used as the additive.

In carrying out the process of this invention, the compound to be reduced is at least partially dissolved in the anhydride medium; or both the anhydride and the compound to be reduced are at least partially dissolved in an appropriate solvent. The basic additive, if used, is combined therewith, and the Raney catalyst, washed free of water, is added. The order of addition of components is not critical, but it is convenient to add the catalyst last, for safety in handling this pyrophoric material.

The hydrogenation may be conducted at low pressures, including atmospheric pressure. It has been found convenient to work at an initial pressure of about 50 p.s.i., since at this pressure the reaction may be carried to completion without repressuring of the apparatus, and the hydrogen uptake is readily measured by the pressure drop. If the hydrogenation is conducted at atmospheric pressure, the hydrogen must of course be replenished as it is used up.

As previously stated, the reaction tends to be exothermic, especially when basic additives are used. Thus, when heat-sensitive groups are present in addition to the nitrile group, temperature control may be necessary to avoid undesired side reactions. Most compounds are reduced at a convenient rate at a temperature of about 50° C., although the temperature may be varied depending on the reactants, and may be substantially increased if no heat-sensitive groups are present. Reductions have been carried out at room temperature, although the rate may be too slow to be practical.

The product of the reduction of nitriles according to this invention is the monoacylated primary amine, which is generally obtained in substantially pure form, without requiring further purification, merely by filtration from the catalyst and separation from any diluent or excess anhydride. If any other amine-forming group is also reduced, such as an oxime or nitro group, this will also be obtained as the acylamine. If it is desired to hydrolyze the acylamine to the free amine, any standard procedure may be used. For example, the hydrolysis is conveniently accomplished by refluxing with concentrated hydrochloric acid, whereby the primary amine is obtained as the amine hydrochloride.

The primary amines provided herein have a wide variety of established uses. For example, linear diamines prepared by the reduction of dinitriles such as adiponitrile are used to prepare polyamide resins such as nylon. The amino groups of certain nutritionally important amino acids may be introduced in this way, such as both the alpha and omega diamino groups in lysine and ornithine by reduction of an alkyl omega-cyano-alpha-oximinovalerate or -butyrate, and also the amino groups in beta-alanine and other pharmaceutically useful amino acids. Polyamines are also useful curing agents for epoxy resins. As intermediates in organic synthesis, primary amines are used to prepare a wide variety of useful compounds. The acylamines provided herein are particularly useful in pharmaceutical products, in agricultural chemicals, and as stabilized forms of primary amines.

The following examples illustrate a variety of specific embodiments of the instant invention:

*Example 1.—Reduction of Phenylacetonitrile*

A Raney nickel catalyst, obtained in the active form under water from the Raney Catalyst Co., Chattanooga, Tenn., and similar to the catalyst described on pp. 181–2 of "Organic Syntheses," Coll. vol. III, was washed free of water with two ethanol washes, and then washed twice with acetic anhydride. About 3 grams (wet weight 8 grams) of the washed catalyst was added to a solution of 11.7 grams of phenylacetonitrile in 100 ml. of acetic anhydride, to which 12 grams of anhydrous sodium acetate had been added, in a Parr reduction apparatus. After purging the Parr apparatus of gases, the system was pressurized to 50 p.s.i. of hydrogen and the temperature was raised to 50° C. The reaction was complete in about 45 minutes, after which the pressure was released and the reaction mixture was filtered at about 50° C. The acetic anhydride was evaporated off under reduced pressure, and the resulting solid mass was recrystallized from ether. There was obtained 15.8 g., 97% of the theoretical yield, of N-acetyl-2-phenylethylamine, M.P. 44–46° (literature value 42–44° C.).

*Anal.*—Calc'd for $C_{10}H_{13}ON$: C, 73.70; H, 7.79; N, 8.60. Found: C, 73.79; H, 7.87; N, 8.88.

Example 2.—Reduction of Adiponitrile

About 5 grams of Raney nickel, obtained and washed as in Example 1, was added to a solution of 21.6 g. of adiponitrile in 240 ml. of acetic anhydride in a Parr reduction apparatus, and to this was added 24.0 grams of anhydrous sodium acetate. The system was purged of gases, and reduction was carried out at 50 p.s.i. of hydrogen at 50° C. for 1 hour. The reaction mixture was filtered at about 50° C., to keep the product in solution while separating the catalyst. The product came out of solution as it cooled, to yield the N,N'-diacetyl derivative of hexamethylenediamine, M.P. 125–126° C. (literature value 125–126° C.). The weight of product was 39.0 g., a yield of 98% of theoretical.

Example 3.—Reduction of Adiponitrile

Adiponitrile was reduced with Raney nickel and acetic anhydride in ethyl acetate solution in the presence of sodium acetate, as follows: To a solution of 37.5 ml. of acetic anhydride in 150 ml. of ethyl acetate was added 10.8 g. of adiponitrile. To the resulting solution was added 2.0 g. of Raney nickel catalyst, obtained and washed as described in Example 1, and 1.5 g. of anhydrous sodium acetate. The mixture was pressurized to 50 p.s.i. with hydrogen in a Parr apparatus and was heated to 50° C. Uptake of hydrogen was complete in 2 hours. The mixture was then filtered to remove catalyst, and the filtrate was evaporated under reduced pressure. As solvent was removed, crystals of N,N'-diacetylhexamethylenediamine came out of solution. These were recovered by suction filtration and dried. A total of 14.0 g. of crystalline N,N' - diacetylhexamethylenediamine, M.P. 125–126° C., was obtained in this way. Removal of all solvent left 7.0 g. of oily residue, shown by infrared spectrum to be N,N'-diacetylhexamethylenediamine containing minor amounts of impurities. The total yield was 18.5 g., 92% of the theoretical amount.

Example 4.—Reduction of Adiponitrile

Adiponitrile was reduced with Raney nickel and acetic anhydride in the presence of sodium hydroxide, as follows: To a solution of 21.6 g. of adiponitrile in 240 ml. of acetic anhydride was added about 5 g. of washed Raney nickel catalyst, obtained and washed as in Example 1, and 8.0 g. of solid sodium hydroxide, in a Parr reduction apparatus. The reaction mixture was pressurized with hydrogen at 50 p.s.i. and heated to 50° C. A vigorously exothermic reaction ensued, raising the temperature to 75° C. Hydrogen uptake was complete in 15 minutes. The reaction mixture was filtered hot, and the filtrate was cooled to precipitate 32.0 g. of N,N'-diacetylhexamethylenediamine, M.P. 125–126° C. An additional 6.0 g. of product was recovered from the filtrate, for a total of 38.0 g., a yield of 96% of theoretical.

Example 5.—Reduction of Adiponitrile

A Raney nickel-chromium catalyst was purchased from the Raney Catalyst Co. in the active form, and washed free of water with two successive portions each of ethanol and acetic anhydride. About 2–3 grams of the washed catalyst was added to a solution of 10.8 g. of adiponitrile in 120 ml. of acetic anhydride in a Parr reduction apparatus. To this was added 12.0 g. of anhydrous sodium acetate, and hydrogenation was conducted at 50° C. at a pressure of 50 p.s.i. for 30 minutes. The reaction mixture was filtered hot, and on cooling precipitated 15.5 g. of crystalline N,N'-diacetylhexamethylenediamine, M.P. 125–126° C. The precipitate amounted to 78% of the theoretical yield. Additional product in the filtrate was not recovered.

Example 6.—Reduction of Benzonitrile

Benzonitrile was reduced in the absence of any basic additive, as follows: About 2–3 g. of Raney nickel, obtained and washed as in Example 1, was added to a solution of 10.3 g. of benzonitrile in 120 ml. of acetic anhydride, and the mixture was shaken in a Parr reduction apparatus with hydrogen at 50 p.s.i. and 50° C. Reduction was complete in about one hour, after which the reaction mixture was filtered hot. The filtrate was treated with 40 ml. of water, followed by 180 ml. of concentrated hydrochloric acid, and the solution was refluxed overnight to hydrolyze the acylamine. The hydrolysate was cooled and made strongly basic with sodium hydroxide, and then extracted twice with ether. The ether solution was dried over magnesium sulfate and filtered. The ether extract was then treated with gaseous hydrogen chloride, to produce benzylamine hydrochloride, M.P. 249° C. (literature value, 249° C.). The weight of benzylamine hydrochloride was 13.0 g., an overall yield of 91% of theoretical.

Example 7.—Reduction of Acrylonitrile

To a solution of 10.1 g. of acrylonitrile in 120 ml. of acetic anhydride was added 2–3 g. of Raney nickel, obtained and prepared as in Example 1, and 12.0 g. of anhydrous sodium acetate. Hydrogenation was carried out at 50 p.s.i. and 50° C., requiring about 2 hours for completion. When reduction was complete the mixture was filtered to remove catalyst and the filtrate was hydrolyzed with 40 ml. of water. One hundred eighty ml. of concentrated hydrochloric acid was then added, and the mixture was heated under reflux for 16 hours to hydrolyze the acylamine. After cooling, the solution was made basic with sodium hydroxide and was treated with stirring with 30.0 g. of benzoyl chloride. The solid which separated was recovered by filtration and dried. There was obtained 1.50 g. (94% of theoretical yield) of N-(n-propyl)benzamide, M.P. 84–85° C. (literature value, 85–86° C.).

Example 8.—Reduction of Ethyl 5-Cyano-2-Oximinovalerate

A 18.4 g. portion of ethyl 5-cyano-2-oximinovalerate was added to 130 g. of acetic anhydride and placed in a Parr pressure apparatus. Raney nickel, obtained as in Example 1, was washed successively with ethanol, ethyl acetate and acetic anhydride. Three and three tenths grams of the washed catalyst and 6 g. anhydrous sodium acetate were added to the pressure apparatus, and shaken with hydrogen at 50 p.s.i. and 50° C. In about 2 hours the theoretical amount of hydrogen (0.8 g.) was taken up, in an exothermic reaction. The pressure was released, and the reaction mixture decanted from the catalyst. The decanted solution was heated with 60 ml. of water to 60° C., to hydrolyze excess acetic anhydride. Then 180 ml. of concentrated hydrochloric acid was added, and the resulting mixture was heated under reflux for 11 hours to hydrolyze the acylamine. The water and hydrochloric acid were then evaporated at reduced pressure at 50–60° C., and the resulting semi-solid mass was treated with 100 ml. of concentrated hydrochloric acid, again evaporating to a semi-solid. This residue was treated with 300 ml. of absolute ethanol, and filtered. To the filtrate was added 1200 ml. of ether. A white precipitate of DL-lysine dihydrochloride formed. This solid was dissolved in 300 ml. of hot 97.5% ethanol, and 22 ml. of pyridine in 50 ml. of hot absolute ethanol was added. A white solid precipitated, and after standing for 12 hours at 5° C. the solid was recovered by filtration and dried. It amounted to 13.0 g. of DL-lysine monohydrochloride. An additional 2.0 g. of product was recovered by concentration of the filtrate, making a total yield of 82% of theoretical, M.P. 259° C. The infrared spectrum was identical with that of an authentic sample of DL-lysine monohydrochloride.

Example 9.—Reduction of Isopropyl 5-Cyano-2-Oximinovalerate

To a solution of 19.8 g. of isopropyl 5-cyano-2-oximinovalerate in 120 ml. of acetic anhydride was added 6.0 g. of anhydrous sodium acetate and 2–3 g. of Raney nickel catalyst, obtained and washed as in Example 8. The mixture was shaken under hydrogen at 50 p.s.i. and 50° C. until uptake was complete, about 30 minutes. The catalyst was removed by filtration, and all volatile material was evaporated under reduced pressure. The residue was taken up in 100 ml. of ethyl acetate, and the insoluble sodium acetate was removed by filtration. An equal volume of ether was added to the filtrate, precipitating more sodium acetate, which also was removed by filtration. The solvent was evaporated under reduced pressure to yield 20.0 g. (73% yield) of isopropyl N,N'-diacetyl-DL-lysine, a thick syrup which partially crystallized on standing.

*Anal.*—Calc'd for $C_{13}H_{24}O_4N_2$: C, 57.33; H, 8.88; N, 10.29. Found: C, 57.28; H, 8.70; N, 10.31.

*Example 10.—Reduction of Methyl 5-Cyano-2-Oximinovalerate*

This experiment was carried out exactly as described in Example 9, using 17.0 g. of methyl 5-cyano-2-oximinovalerate. There was obtained 18.5 g. (76% yield) of methyl N,N'-diacetyl-DL-lysine, a thick syrup.

*Anal.*—Calc'd for $C_{11}H_{20}O_4N_2$: C, 54.08; H, 8.25; N, 11.47. Found: C, 54.29; H, 8.19; N, 11.42.

*Example 11.—Reduction of Ethyl 5-Cyano-2-Oximinovalerate*

About 2–3 grams of Raney nickel-chromium, obtained and prepared as in Example 4, was added to a solution of 18.4 g. of ethyl 5-cyano-2-oximinovalerate and 6.0 g. of anhydrous sodium acetate in 120 ml. of acetic anhydride. Reduction was carried out in a Parr apparatus at 50 p.s.i. of hydrogen and 50° C. for one hour. After reduction was complete the mixture was filtered free of catalyst and the acetic anhydride was stripped from the mixture at reduced pressure. The residual viscous mass was taken up in 100 ml. of ethyl acetate, filtered free of sodium acetate, and to the filtrate was added 400 ml. of ether. The product separated as an oil, which was taken up in 30–50 ml. of ethyl acetate and filtered again. The filtrate was stripped under vacuum of all solvent, leaving 25.8 g. (100% yield) of the ethyl ester of N,N'-diacetyl-DL-lysine as a thick syrup. This material was essentially pure, as shown by its analysis:

*Anal.*—Calc'd for $C_{12}H_{22}O_4N_2$: C, 55.79; H, 8.59; N, 10.85. Found: C, 55.98; H, 8.57; N, 10.62.

On long standing the syrup crystallized, and repeated recrystallization gave two dimorphic crystalline forms of ethyl N,N'-diacetyl-DL-lysine, one melting at 81° C. and one melting at 110° C.

*Example 12.—Reduction of Ethyl 5-Cyano-2-Oximinovalerate*

About 2–3 g. of Raney nickel, obtained and washed as in Example 1, was added to a solution of 18.4 g. of ethyl 5-cyano-2-oximinovalerate in 120 ml. of propionic anhydride, and to this mixture was added 6.0 g. of anhydrous sodium acetate. Reduction was carried out at 50 p.s.i. of hydrogen and 50° C. After two hours reduction was complete. The mixture was filtered free of catalyst, and the propionic anhydride was stripped from the mixture at reduced pressure. The resulting mass was taken up in 100 ml. of ethyl acetate, and filtered free of sodium acetate. The filtrate was concentrated to give 20.7 g. (78% yield) of the ethyl ester of N,N'-dipropionyl-DL-lysine as a thick syrup.

*Analysis.*—Calc'd for $C_{14}H_{26}O_4N_2$: C, 58.85; H, 9.00; N, 8.38. Found: C, 59.07; H, 8.85; N, 8.63. On long standing the syrup partially crystallized to give a solid having an infrared spectrum identical to that of the syrup.

*Example 13.—Reduction of Ethyl 5-Cyano-2-Oximinovalerate*

About 2–3 g. of Raney nickel, prepared as in Example 1, was added to a solution of 18.4 g. of ethyl 5-cyano-2-oximinovalerate and 3.0 g. of potassium hydroxide in 120 ml. of acetic anhydride, in a Parr reduction apparatus. Reduction was carried out at 50 p.s.i. of hydrogen and 50° C. Reduction was complete in 15 minutes. The pressure was released, the mixture was filtered free of catalyst, and the acetic anhydride was evaporated under reduced pressure. The residual viscous mass was taken up in 100 ml. of ethyl acetate, filtered free of sodium acetate, and to the filtrate was added 300 ml. of ether. The product separated as an oil, which was taken up in 30–50 ml. of ethyl acetate and filtered again. The filtrate was stripped under vacuum of all solvent, leaving an oil which crystallized to produce 25.2 g. of the ethyl ester of N,N'-diacetyl-DL-lysine, yield 98% of theoretical. The infrared spectrum was identical with that of an authentic sample.

The above procedure was repeated, omitting the potassium hydroxide. After 6 hours hydrogen uptake was apparently complete. However, only 4.8 grams of the desired product was obtained, yield 19% of theoretical.

*Example 14.—Reduction of Ethyl 5-Cyano-2-Oximinovalerate*

About 2–3 g. of Raney nickel, prepared as in Example 1, was added to a solution of 9.2 g. of ethyl 5-cyano-2-oximinovalerate in 60.0 ml. of acetic anhydride in a Parr bomb. To this was also added 1.5 g. of anhydrous benzyltrimethylammonium hydroxide. This mixture was placed in a Parr reduction apparatus, and after flushing of gases, the system was pressurized to 50 p.s.i. of hydrogen, and the temperature was raised to 50° C. An exothermic reaction ensued, during which the temperature reached 75° C. The reduction was complete in 15 minutes. The reaction mixture was then filtered free of catalyst, and the filtrate was decomposed with 30.0 ml. of water. After the decomposition was complete, 150.0 ml. of concentrated hydrochloric acid were added, and the resulting solution was refluxed overnight. The resulting hydrolysate was concentrated in vacuo to dryness and treated with two successive 25.0 ml. portions of concentrated hydrochloric acid, each being stripped to dryness. The final residue was taken up in 80.0 ml. of 95% ethanol, and the resulting solution was diluted with 320.0 ml. of ether. The ether was decanted off, and the residue was taken up in 150.0 ml. of hot 95% ethanol. To this solution was added a hot solution of 15.0 ml. of pyridine in 15.0 ml. of 95% ethanol. The mixture was cooled for two hours, and crystals of DL-lysine hydrochloride, M.P. 264° C., were recovered by filtration. The amount of material recovered was 8.0 g., 88% of the theoretical yield. The compound was identified by comparison of its infrared spectrum with that of an authentic sample of DL-lysine monohydrochloride.

*Example 15.—Reduction of Acetone Cyanohydrin*

About 2–3 g. of Raney nickel, prepared as in Example 1, was added to a solution of 17.0 g. of acetone cyanohydrin in 240 ml. of acetic anhydride containing 24.0 g. of anhydrous sodium acetate. The mixture was charged to a Parr bomb and reduced at 50° C. at 50 p.s.i. of hydrogen for one hour. The reaction mixture was filtered hot, and the filtrate was decomposed with 100 ml. of water. After decomposition of the anhydride was complete, 360 ml. of concentrated hydrochloric acid were added, and the entire mixture was refluxed overnight. The resulting hydrolysate was concentrated to dryness under vacuum, the product was taken up in absolute ethanol and filtered free of salts, the filtrate was again concentrated to dryness and again taken up in absolute ethanol and filtered. To this filtrate was added approximately 8–10 volumes of dry ether. The crystals of product were handled in as dry a situation as possible because of their hygroscopic nature. Much of this very difficultly crystallizable material remained dissolved in the ether. There was isolated 10.0 g., 40% of theoretical yield, of the hydrochloride of 1-amino-t-butanol, M.P. 70–72° (literature value, 70–72°).

Example 16.—Reduction of Tridecanenitrile

About 2–3 g. of Raney nickel, prepared as in Example 1, and 12.0 g. of anhydrous sodium acetate, was added to a solution of 19.8 g. of tridecanenitrile in 120.0 ml. of acetic anhydride. The mixture was reduced in a Parr apparatus at 50 p.s.i. of hydrogen and 50° C. When reduction was complete in about one hour, the reaction mixture was filtered hot. The product, the N-acetyl derivative of tridecylamine, crystallized out of the filtrate as it cooled. It amounted to 24.1 g. (100% yield), M.P. 57–58° C.

*Analysis.*—Calc'd for $C_{10}H_{31}ON$: C, 74.41; H, 13.59; N, 5.76. Found: C, 74.62; H, 13.04; N, 5.44.

Example 17.—Reduction of Tridecanenitrile

About 2–3 g. of a Raney cobalt catalyst, obtained in the active form from the Raney Catalyst Co., and washed free of water with successive washes of ethanol and acetic anhydride, was added to a solution of 9.9 g. of tridecanenitrile in 120 ml. of acetic anhydride, and to the solution was added 12.0 g. of anhydrous sodium acetate. The mixture was reduced at 50 p.s.i. of hydrogen and 50° C. When reduction was complete, in about one hour, the reaction mixture was filtered hot. The product, the N-acetyl derivative of tridecylamine, crystallized out of the filtrate as it cooled. It amounted to 7.2 g. (64% yield), M.P. 57–58° C. Mixed M.P. with authentic sample, 57–58° C.

Example 18.—Reduction of Tridecanenitrile

A Raney nickel-chromium catalyst was obtained and prepared as described in Example 4. About 2–3 g. of this catalyst was added to a solution of 9.9 g. of tridecanenitrile in 120 ml. of acetic anhydride, and to the solution was added 12.0 g. of anhydrous sodium acetate. The mixture was reduced at 50 p.s.i. of hydrogen and 50° C. for about one hour. The reaction mixture was filtered hot, and the product, N-acetyl tridecylamine, crystallized out of the filtrate as it cooled. It amounted to 10.0 g., yield 89% of theoretical, M.P. 57–58° C.

From the foregoing description and illustrative examples it is apparent that the novel process of this invention is susceptible to numerous modifications and variations within the scope of the disclosure, and it is intended to include such modifications and variations in the following claims.

We claim:

1. The method of reducing an organic nitrile to an acylated primary amine which comprises contacting the organic nitrile with hydrogen in a system comprising (1) a Raney metal catalyst and (2) at least one mole of a liquid aliphatic acid anhydride per amine-forming group in said organic nitrile.
2. The method of claim 1, wherein the Raney metal catalyst is Raney nickel.
3. The method of claim 1, wherein the Raney metal catalyst is Raney cobalt.
4. The method of claim 1, wherein the Raney metal catalyst is Raney nickel-chromium.
5. The method of claim 1, wherein the acid anhydride is acetic anhydride.
6. The method of claim 1, wherein the acid anhydride is propionic anhydride.
7. The method of reducing an organic nitrile to an acylated primary amine which comprises contacting the organic nitrile with hydrogen in a system comprising (1) a Raney metal catalyst, (2) at least one mole of a liquid aliphatic acid anhydride per amine-forming group in said organic nitrile and (3) an alkaline substance.
8. The method of reducing an organic nitrile to an acylated primary amine which comprises contacting the organic nitrile with hydrogen in a system comprising (1) a Raney metal catalyst, (2) at least one mole of a liquid aliphatic acid anhydride per amine-forming group in said organic nitrile and (3) a basic salt.
9. The method of claim 8, wherein the basic salt is sodium acetate.
10. The method of reducing an organic nitrile to an acylated primary amine which comprises contacting the organic nitrile with hydrogen in a system comprising (1) a Raney metal catalyst, (2) at least one mole of a liquid aliphatic acid anhydride per amine-forming group in said organic nitrile and (3) a strong base.
11. The method of claim 10, wherein the strong base is an alkaline hydroxide.
12. The method of claim 10, wherein the strong base is sodium hydroxide.
13. The method of claim 10, wherein the strong base is potassium hydroxide.
14. The method of claim 10, wherein the strong base is trimethylbenzylammonium hydroxide.
15. The method of reducing an organic compound containing nitrile and oxime groups which comprises contacting said organic compound with hydrogen in a system comprising (1) a Raney metal catalyst, (2) at least one mole of a liquid aliphatic acid anhydride per amine-forming group in said organic compound and (3) an alkaline substance, thereby reducing the nitrile and the oxime groups to acylated primary amino groups.
16. The method of reducing an omega-cyano alpha-oximino carboxylate to an N,N'-diacylated alpha,omega-diamino carboxylate, which comprises contacting the omega-cyano alpha-oximino carboxylate with hydrogen in a system comprising (1) a Raney metal catalyst (2) at least two moles of a liquid aliphatic acid anhydride per mole of said carboxylate and (3) an alkaline substance, thereby reducing the nitrile and the oxime groups to acylated primary amino groups.
17. The method of reducing an alkyl 5-cyano-2-oximino valerate to an alkyl ester of N,N'-diacyl-DL-lysine which comprises contacting the alkyl 5-cyano-2-oximinovalerate with hydrogen in a system comprising (1) a Raney metal catalyst, (2) at least two moles of a liquid aliphatic acid anhydride per mole of valerate and (3) an alkaline substance.
18. The method of claim 17, wherein the Raney metal catalyst is Raney nickel.
19. The method of claim 17, wherein the alkaline substance is an alkaline hydroxide.
20. The method of reducing ethyl 5-cyano-2-oximinovalerate to ethyl N,N'-diacetyl-DL-lysine which comprises contacting ethyl 5-cyano-2-oximinovalerate with hydrogen in a system comprising (1) a Raney metal catalyst, (2) at least two moles of acetic anhydride per mole of valerate and (3) an alkaline substance.
21. The method of reducing adiponitrile to N,N'-diacylhexamethylenediamine which comprises contacting adiponitrile with hyrogen in a system comprising (1) a Raney metal catalyst, (2) at least two moles of a liquid aliphatic acid anhydride per mole of adiponitrile and (3) an alkaline substance.

References Cited in the file of this patent

UNITED STATES PATENTS 2,232,598    Farlow _____ Feb. 18, 1941

OTHER REFERENCES

Beilstein Bd. 4, (vierte auflage), pp. 198, 199 (1922).
Neuberger: Biochem. J., vol. 32, (1938), p. 1455.
Hoy et al.: J. Org. Chem., vol. 23, p. 968 (1958)

UNITED STATES PATENT OFFICE
CERTIFICATE OF CORRECTION

Patent No. 3,062,869                                             November 6, 1962

Francis E. Gould

It is hereby certified that error appears in the above numbered patent requiring correction and that the said Letters Patent should read as corrected below.

Column 1, line 19, for "in" read -- is --; column 2, line 51 to 53, strike out "present, and it has been found that at least a four molar excess of anhydride should be"; column 6, line 32, for "1.50 g." read -- 15.0 g. --; same line 32, for "n" read -- $\underline{n}$ --; column 9, line 12, for "$C_{10}$" read -- $C_{15}$ --

Signed and sealed this 4th day of June 1963.

(SEAL)
Attest:

ERNEST W. SWIDER
Attesting Officer

DAVID L. LADD
Commissioner of Patents